United States Patent Office
3,521,768
Patented July 28, 1970

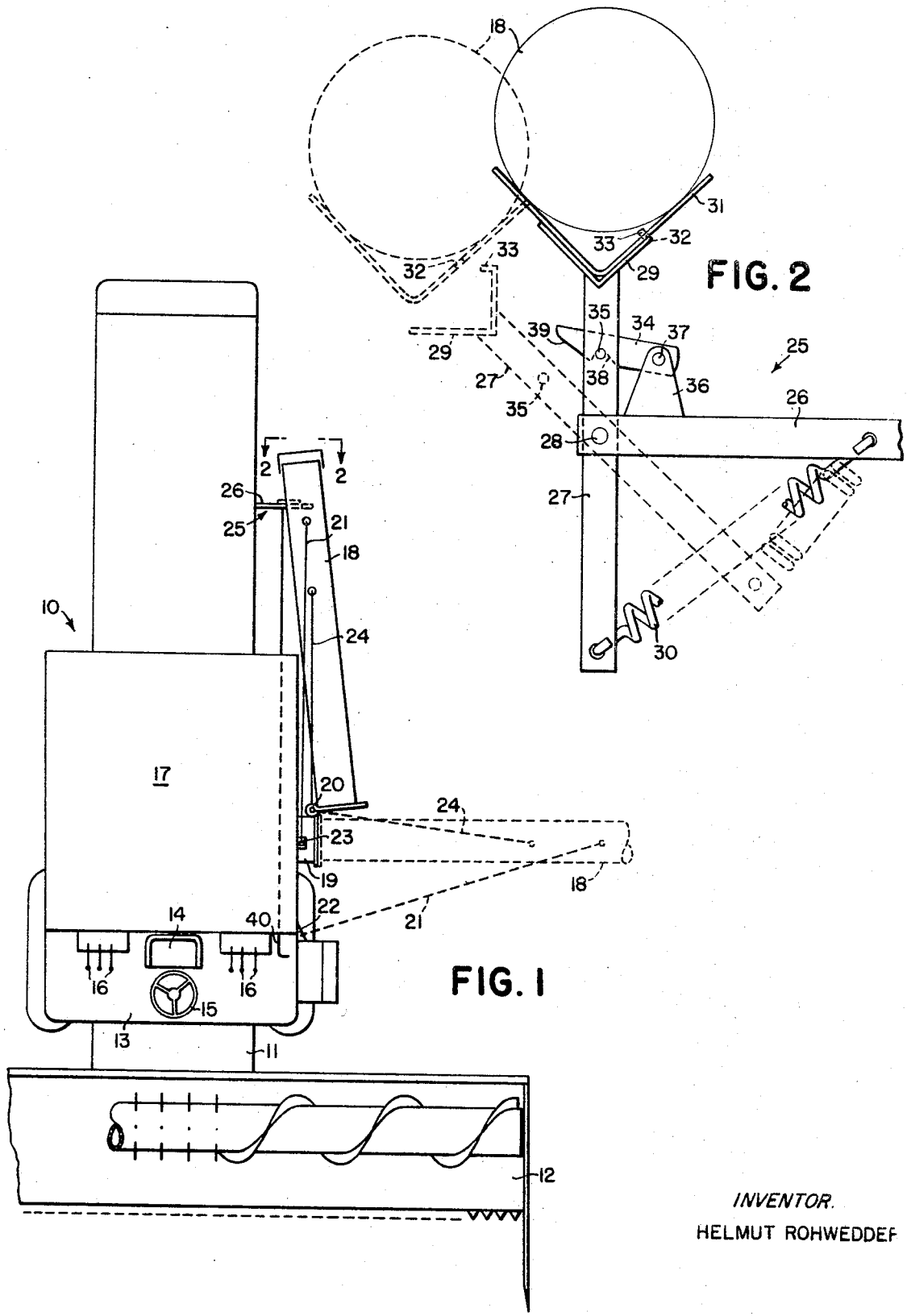

3,521,768
SUPPORT FOR A GRAIN TANK DISCHARGE PIPE
Helmut Rohwedder, Mittelbach, Germany, assignor to Deere & Company, Moline, Ill., a corporation of Delaware
Filed Feb. 3, 1969, Ser. No. 795,984
Claims priority, application Germany, July 2, 1968, 1,757,962
Int. Cl. B60p 1/42; B65g 21/02
U.S. Cl. 214—83.26
6 Claims

ABSTRACT OF THE DISCLOSURE

An arm pivotally mounted to the side of a combine carries a cradle at one end to receive and support the combine grain tank discharge pipe when the pipe is moved to a transport position. The arm is movable between upper and lower positions in which the cradle is open upwardly and open at approximately a 45° angle from the vertical, respectively. As the pipe is moved to the transport position, it moves into the cradle and moves the arm to the upper position where the arm is automatically locked against movement. A spring acts against the arm to return the arm to the lower position when the lock is released.

BACKGROUND OF THE INVENTION

The present invention relates generally to combines, and more particularly relates to structure for supporting a combine grain tank discharge pipe in a transport position.

It has become commonplace to provide a combine grain tank with a discharge pipe which is pivotally mounted on the tank for movement between a discharge position in which it extends generally perpendicular to the length of the combine and a transport position in which it extends generally along the length of the combine to reduce the overall width of the combine for transport purposes. In the transport position, the delivery end of the discharge pipe is supported by an arm provided on the outside of the combine casing and locked in position thereon by a suitable locking device. Since particularly long discharge pipes sag at the delivery end due to their own weight, the discharge pipe must be lifted in order to be pushed onto the supporting arm. Lifting of the discharge pipe required considerable effort and also required that the operator of the combine leave the operator's platform.

The present invention is intended to provide a structure for supporting the delivery end of a discharge pipe which overcomes all disadvantages of the discharge pipe supporting structures heretofore known.

SUMMARY OF THE INVENTION

The object of the present invention is to provide, in combination with a combine having a grain tank and a discharge pipe pivotally mounted on the tank for movement between discharge and transport positions, and adjustably mounted support structure for the delivery end of the pipe which will automatically move from a lower position to an upper position to raise and support the delivery end of the discharge pipe as the pipe is swung to the transport position.

According to the invention, the discharge pipe supporting structure takes the form of an arm pivotally mounted to the side of the combine for movement in a plane generally perpendicular to the length of the combine and which carries a cradle at its upper end. The arm is movable between a lower position in which the cradle is open generally outwardly and upwardly from the combine and an upper position in which the cradle is open upwardly. As the discharge pipe is swung toward the transport position, it engages the cradle and the momentum of the discharge pipe moves the arm to the upper position where the cradle supports the delivery end of the discharge pipe. The movement of the arm to the upper position raises the delivery end of the discharge pipe a short distance to remove the sag from the pipe and to relieve the stresses caused by the weight of the pipe.

According to another feature of the invention, the supporting structure is provided with a latch which automatically locks the pivotally mounted arm in the upper position to hold the discharge pipe in the transport position.

Still another feature of the invention lies in the provision of a biasing means acting against the pivotally mounted arm to return the arm to the lower position when the latch is released. The biasing means pushes the discharge pipe back towards the discharge position and retains the arm in the lower position until the pipe is again moved to the transport position.

The above objects and features and additional objects and features of the present invention will become apparent along with the details of construction of a preferred embodiment of the invention from a reading of the following detailed description when taken in conjunction with the accompanying drawing.

BRIEF DESCRIPTION OF THE DRAWING

In the drawing:

FIG. 1 is a top plan view of a combine with the grain tank discharge pipe illustrated in the transport position, the dotted lines illustrating the discharge pipe in the discharge position; and FIG. 2 is an elevational view of the discharge pipe supporting structure taken in the direction of the arrows 2—2 of FIG. 1, the dotted lines illustrating the relative positions of the discharge pipe and support structure prior to engagement of the same.

DESCRIPTION OF THE PREFERRED EMBODIMENT

Referring now to the drawing, a combine is indicated generally at 10 and includes the conventional feeder housing 11 and harvesting platform 12 carried at the forward end of the feeder housing 11. An operator's platform 13 is located behind and above the feeder housing 11 and includes the conventional seat 14, steering wheel 15, and control levers 16. The combine grain tank 17 is located directly behind the operator's platform 13 and includes a discharge pipe 18. Although not illustrated in the drawing for the purpose of simplicity, the grain tank 17 will include a transversely extending horizontal conveying screw having an outlet end connected with a second conveying screw provided in the discharge pipe 18.

The discharge pipe 18 is mounted on the grain tank outlet 19 by a pivot 20 so that the discharge pipe 18 can be moved between a transport position illustrated by the full lines in FIG. 1 and a discharge position illustrated by the dotted lines in FIG. 1. A tie rod 21 interconnects the outer end of the discharge pipe 18 and the combine. The outer end of the tie rod 21 is pivotally connected to the discharge pipe 18 and the inner end of the tie rod 21, when the pipe is in the discharge position, is releasably secured to a bracket 22 or the like mounted on the combine in a position close to the operator's platform. In order to swing the discharge pipe 18 to its transport position, the inner end of the tie rod 21 must be released from the bracket 22 and secured to an additional bracket 23 mounted on the combine. A second tie rod 24 has one end secured to the discharge pipe 18 intermediate the ends thereof and has its opposite end pivotally mounted for movement about the axis of the hinge 20. The tie rod 24 provides support for the discharge pipe during the movement of the pipe between its transport and discharge positions.

When the discharge pipe 18 is in the transport position, the delivery end is carried by a supporting structure indicated generally at 25. The supporting structure includes a first arm 26 fixed to the side of the combine and projecting outwardly therefrom, and a second arm 27 pivotally mounted intermediate its ends to the free end of the arm 26 by a pin 28. The upper end of the arm 27 carries a cradle 29 and the lower end of the arm 27 is interconnected with the arm 26 by a tension spring 30 which normally urges the lower end of the arm 27 toward the side of the combine. In the illustrated embodiment of the invention, the cradle 29 takes the form of a right angle bracket which mates with a corresponding right angle bracket 31 secured to the bottom of the discharge pipe 18. The pivoted arm 27 is movable between a lower position in which the cradle 29 is open outwardly and upwardly and an upper position in which the cradle 29 is open upwardly. When the arm 27 is in its lower position, the bracket 31 on the discharge pipe 18 will contact one leg of the cradle as the discharge pipe 18 is swung to its transport position and when the arm 27 is moved to its upper position the bracket 31 will be nested completely within the cradle 29. For the purpose of preventing the discharge pipe 18 from bouncing out of the cradle 29 due to vibrations and the like, the bracket 31 is provided with an opening 32 and the cradle 29 is provided with a projection 33 which moves into the opening 32 as the bracket 31 contacts the cradle 29.

When the pivoted arm 27 is moved to its upper position, it is automatically locked against additional movement by the cooperating action of a latch plate 34 and a latch pin 35 carried by the arms 26 and 27 respectively. The latch plate 34 is pivotally mounted by pin 37 to a bracket 36 fixed to the arm 26 and is provided with a locking recess 38 and a cam surface 39 leading to the recess 38. As the arm 27 moves towards its upper position, the latch pin 35 will engage the cam surface 39 and move the latch plate 34 upwardly until the pin 35 is in alignment with the recess 38. With the latch pin 35 and recess 38 in alignment, the latch plate 34 will drop over the latch pin 35 by the force of gravity. The latch plate 34 can be raised to release the latch pin 35 by a remote control device operable from the operator's platform and indicated schematically at 40.

The turning and locking of the discharge pipe is accomplished in the following manner. The combine operator removes the inner end of the tie rod 21 from the bracket 22 and pushes on the tie rod 21 to move the discharge pipe 18 toward the transport position. As the discharge pipe 18 approaches its transport position, the bracket 31 and cradle 29 move into engagement and the projection 33 on the cradle 29 moves into the opening 32 provided in the bracket 31. The momentum of the discharge pipe 18 assures continual movement of the pipe 18 and swings the arm 27 about its pivot 28 while the bracket 31 slides into the cradle 29. As the arm 27 is moved to its upper position, the spring 30 is tensioned and when the arm 27 reaches its upper position the latch plate 34 drops over the latch pin 35 to lock the arm 27 in its upper position. With the discharge pipe 18 in the transport position, the inner end of the tie rod 21 is fixed to the bracket 23.

In order to return the discharge pipe 18 to its discharge position, it is only necessary to release the tie rod 21 from the bracket 23 and to rotate the latch plate 34 by operation of the remote control device 40. The energy stored in the tension spring 30 will force the arm 27 to its lower position and push the discharge pipe 18 toward the discharge position. The operator can continue the movement of the discharge pipe 18 by pulling on the tie rod 21. The discharge pipe 18 is then locked within its discharge position by securing the inner end of the tie rod 21 to the bracket 22.

It should be noted that the discharge pipe 18 can be swung to either the transport or discharge position without the combine operator leaving the operator's platform 13 and also that the supporting structure 25 automatically raises delivery of the discharge pipe 18 to remove the sag therefrom and to relieve the stress from the tie rod 24.

I claim:

1. In a combine: a grain tank; a discharge pipe pivotally mounted on the tank for movement between transport and discharge positions; supporting means for the delivery end of the discharge pipe when in the transport position; the supporting means being vertically movable between upper and lower positions and being responsive to the movement of the discharge pipe from the discharge position to the transport position to automatically move to the upper position; and means releasably locking the supporting means in the upper positions.

2. The combination set forth in claim 1 further including biasing means urging the supporting means toward the lower position.

3. In combination with a combine having a grain tank and a discharge pipe pivotally mounted on the tank for movement between discharge and transport positions in which it extends generally outwardly of and generally along the length of the combine, respectively, a device for supporting and locking the pipe in the transport position comprising: an arm pivotally mounted on the combine for movement in a plane generally perpendicular to the length of the combine between a lower position in which it extends generally outwardly and upwardly from the combine and an upper position at which it extends generally vertically upwardly; a cradle mounted on the upper end of the arm for receiving and carrying the pipe; and means for releasably locking the arm in the upper position; whereby, when the pipe is swung from the discharge position to the transport position it will engage the cradle and move the arm to the upper position where the arm will be locked to maintain the pipe in the transport position.

4. The combination as set forth in claim 3 wherein the means for releasably locking the arm in the upper position includes a latch plate pivotally mounted on the combine and a pin carried by the arm, the latch plate having a recess for receiving the pin and a cam surface leading to the recess, whereby as the arm moves to the upper position the pin will engage the cam surface to lift the latch plate and when the pin moves into alignment with the recess the latch plate will drop over the pin to automatically lock the arm in the upper position.

5. The combination set forth in claim 3 further including means biasing the arm toward the lower position whereby, when the means locking the arm in the upper position is released, the arm will be moved to its lower position to push the pipe to the discharge position.

6. The combination set forth in claim 3 wherein the cradle is generally of V-shape, a matching generally V-shaped support element is fixed to the bottom of the pipe, and the cradle and support element includes cooperating means locking the support element within the cradle when the arm is in the upper position.

References Cited

UNITED STATES PATENTS

| 2,585,414 | 2/1952 | Steffens | 214—83.26 XR |
|---|---|---|---|
| 2,783,907 | 3/1957 | Hudkins | 214—522 |
| 2,981,400 | 4/1961 | Rohwedder | 198—113 XR |

ALBERT J. MAKAY, Primary Examiner

U.S. Cl. X.R.

198—113, 124; 214—83.32; 248—293